(12) United States Patent
Ma et al.

(10) Patent No.: US 11,402,710 B2
(45) Date of Patent: Aug. 2, 2022

(54) DISPLAY SUBSTRATE, DISPLAY PANEL, AND DISPLAY APPARATUS

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Yongda Ma, Beijing (CN); Yong Qiao, Beijing (CN); Jianbo Xian, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 238 days.

(21) Appl. No.: 16/617,776

(22) PCT Filed: Jun. 26, 2019

(86) PCT No.: PCT/CN2019/093073
§ 371 (c)(1),
(2) Date: Nov. 27, 2019

(87) PCT Pub. No.: WO2020/107885
PCT Pub. Date: Jun. 4, 2020

(65) Prior Publication Data
US 2021/0341808 A1 Nov. 4, 2021

(30) Foreign Application Priority Data
Nov. 28, 2018 (CN) .......................... 201821975020.0

(51) Int. Cl.
*G02F 1/1362* (2006.01)
(52) U.S. Cl.
CPC .............................. *G02F 1/136286* (2013.01)

(58) Field of Classification Search
CPC .................................................. G02F 1/136286
See application file for complete search history.

(56) References Cited

U.S. PATENT DOCUMENTS

2003/0202133 A1* 10/2003 Yun ................... G02F 1/133784
349/43
2016/0033805 A1 2/2016 Han
(Continued)

FOREIGN PATENT DOCUMENTS

| CN | 104142588 A | 11/2014 |
| CN | 204964955 U | 1/2016 |

(Continued)

OTHER PUBLICATIONS

International Search Report dated Oct. 9, 2019, issued in Application No. PCT/CN2019/093073 (11 pages).

*Primary Examiner* — Sang V Nguyen
(74) *Attorney, Agent, or Firm* — WHDA, LLP (57) ABSTRACT

A display substrate may include at least one connection structure (1) in a non-display area (89) of the display substrate. The at least one connection structure (1) may include a first conductive layer (11), at least one insulating layer (19) on the first conductive layer (11), and a second conductive layer (12) on a side of the at least one insulating layer (19) opposite from the first conductive layer (11). The second conductive layer 12) may be connected to the first conductive layer (11) through a plurality of via holes (3) in the at least one insulating layer (19), and at least two of the plurality of via holes (3) may have different contact areas with the first conductive layer (11). The display substrate can be at least partially solves the problem that the through hole is easy to be burnt when over-current problem.

18 Claims, 9 Drawing Sheets

(56) References Cited

U.S. PATENT DOCUMENTS

| | | | |
|---|---|---|---|
| 2018/0053718 A1* | 2/2018 | Cheng | H01L 23/528 |
| 2018/0151660 A1* | 5/2018 | Kim | H01L 27/3262 |
| 2018/0175065 A1* | 6/2018 | Liu | H01L 27/124 |
| 2019/0165000 A1* | 5/2019 | Li | H01L 21/76802 |
| 2019/0229130 A1 | 7/2019 | Ma et al. | |

FOREIGN PATENT DOCUMENTS

| | | |
|---|---|---|
| CN | 205428907 U | 8/2016 |
| CN | 107390443 A | 11/2017 |
| CN | 208937876 U | 6/2019 |
| JP | 2011017821 A | 1/2011 |
| KR | 101466488 B1 | 11/2014 |

\* cited by examiner

DISPLAY SUBSTRATE, DISPLAY PANEL, AND DISPLAY APPARATUS

CROSS-REFERENCE TO RELATED APPLICATIONS

This application claims benefit of the filing date of Chinese Patent Application No. 201821975020.0 filed on Nov. 28, 2018, the disclosure of which is hereby incorporated in its entirety by reference.

TECHNICAL FIELD

The present disclosure relates to display technology, in particular, to a display substrate, a display panel, and a display apparatus.

BACKGROUND

In a display substrate of a liquid crystal display apparatus or the like, a display area is provided with signal lines such as gate lines and data lines to drive pixel units (sub-pixels) for display. These signal lines can introduce signals through connection structures provided in the non-display area. Specifically, a terminal of a driving chip is connected to a signal introduction line on the display substrate, and the signal introduction line is covered with an insulating layer. At the connection structure, a signal line is disposed above the insulating layer, and is connected with the signal introduction line through the via holes in the insulating layer.

BRIEF SUMMARY

One embodiment of the present disclosure provides a display substrate. The display substrate may include at least one connection structure in a non-display area of the display substrate. The at least one connection structure may include a first conductive layer, at least one insulating layer on the first conductive layer, and a second conductive layer on a side of the at least one insulating layer opposite from the first conductive layer. The second conductive layer may be connected to the first conductive layer through a plurality of via holes in the at least one insulating layer, and at least two of the plurality of via holes may have different contact areas with the first conductive layer.

Optionally, at least two of the plurality of via holes have different shapes.

Optionally, the plurality of via holes comprise at least one set of adjacent via holes, the set of adjacent via holes comprising two adjacent via holes, and at least one of the two adjacent via holes is provided with a recess at a position facing the other one of the two adjacent via holes.

Optionally, each of the two adjacent via holes is provided with a recess at a position facing the other one of the two adjacent via holes.

Optionally, at least one of the two adjacent via holes comprises a first via hole and a second via hole, the first via hole has a first center, and the second via hole has a second center at a different position from the first center.

Optionally, the recess comprises a first recess on the first via hole and a second recess on the second via hole, one radial direction of the first recess coincides with a line between the first center and the second center, and one radial direction of the second recess coincides with a line between the first center and the second center.

Optionally, a number of the plurality of via holes is in a range of two to four.

Optionally, the connection structure further comprises a third conductive layer between the first conductive layer and the second conductive layer, the at least one insulating layer is between the first conductive layer and the third conductive layer, and at least another insulating layer is between the third conductive layer and the second conductive layer.

Optionally, at least one of the plurality of via holes connecting the first conductive layer and the second conductive layer comprises an upper via hole penetrating the at least another insulating layer between the second conductive layer and the third conductive layer and a lower via hole penetrating the third conductive layer and the at least one insulating layer between the third conductive layer and the first conductive layer; and wherein the upper via hole is connected with the lower via hole, and the second conductive layer is connected to the third conductive layer through the upper via hole and further connected to the first conductive layer through the lower via hole.

Optionally, an area of an opening of the upper via hole at a surface of the third conductive layer opposite from the first conductive layer is larger than an area of an opening of the lower via hole at the surface of the third conductive layer opposite from the first conductive layer, such that the second conductive layer is in contact with the surface of the third conductive layer opposite from the first conductive layer.

Optionally, a slope of a sidewall of the lower via hole is in a range of between 15 degrees and 75 degrees.

Optionally, the display substrate comprises at least one bridging structure composed of two of the at least one connection structure; for the two of the at least one connection structure, the two first conductive layers are spaced apart from each other, and the two second conductive layers are disposed in the same layer and integrally connected.

Optionally, for the two of the at least one connection structure, the two first conductive layers are disposed in different layers.

Optionally, the first conductive layer is a signal introduction line, and the signal introduction line is configured to electrically connect with a driving signal source; the second conductive layer is a signal line extending into a display area of the display substrate, and the signal line is configured to drive pixel units in the display area.

Optionally, the second conductive layer is a signal introduction line, and the signal introduction line is configured to electrically connect with a driving signal source; the first conductive layer is a signal line extending into a display area of the display substrate, and the signal line is configured to drive pixel units in the display area.

Optionally, the signal line includes a gate line and/or a data line.

One embodiment of the present disclosure is a display panel, comprising the display substrate according to one embodiment of the present disclosure.

One embodiment of the present disclosure is a display apparatus, comprising the display panel according to one embodiment of the present disclosure.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the present disclosure are apparent from the following detailed description taken in conjunction with the accompanying drawings in which:

DETAILED DESCRIPTION

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-9. When referring to the figures, like structures and elements shown throughout are indicated with like reference numerals.

Unless otherwise defined, technical terms or scientific terms used in the present disclosure are intended to be in the ordinary meaning of those of ordinary skill in the art. The words "first," "second" and similar words used in the present disclosure do not denote any order, quantity or importance, but are merely used to distinguish different components. The words "including" or "comprising" and the like mean that the element or the item preceding the word includes the element or item listed after the word and its equivalent and do not exclude other components or objects. "Coupled" and the like are not limited to physical or mechanical connections, but may include electrical connections, whether direct or indirect. "Upper," "lower," "left," "right," etc. are only used to indicate the relative positional relationship. When the absolute position of the object being described is changed, the relative positional relationship may also change accordingly.

In the description of the following embodiments, specific features, structures, materials or characteristics may be combined in any suitable manner in any one or more embodiments or examples.

In the present disclosure, the two structures "disposed in the same layer" mean that the two structures are formed in the same step by the same layer of material, so they are in the same layer in the laminated relationship. But it does not mean that the two structures have equal distance to the substrate, nor does it mean that the other layer structures between the substrate and each of the two structures are the same.

When an overcurrent is generated in the signal line due to static electricity accumulation or the like (a large current exceeding a preset current), it is easy to generate high heat concentrated at the via holes connecting the signal lines and the signal introduction lines, thereby causing the via holes to be burned out and affecting the signal transmission.

As shown in FIGS. 1 to 8, one embodiment of the present disclosure provides a display substrate.

The display substrate may be a display substrate for a display apparatus such as a liquid crystal display apparatus or an organic light emitting diode (OLED) display apparatus.

The display substrate according to one embodiment of the present disclosure includes a display area 88 and a non-display area 89. At least one connection structure 1 is disposed in the non-display area 89. Each connection structure 1 includes: a first conductive layer 11; at least one insulating layer 19 covering the first conductive layer 11; a second conductive layer 12 disposed on a side of the insulating layer 19 opposite from the first conductive layer 11.

In the connection structure 1, the second conductive layer 12 is connected to the first conductive layer 11 through a plurality of via holes 3 in the insulating layer 19 between the first conductive layer 11 and the second conductive layer 12. Furthermore, at least two of the via holes 3 have different contact areas with the first conductive layer 11. That is, openings of at least two of the via holes at the contacting surface of the first conductive layer 11 have different areas.

Figure 1:
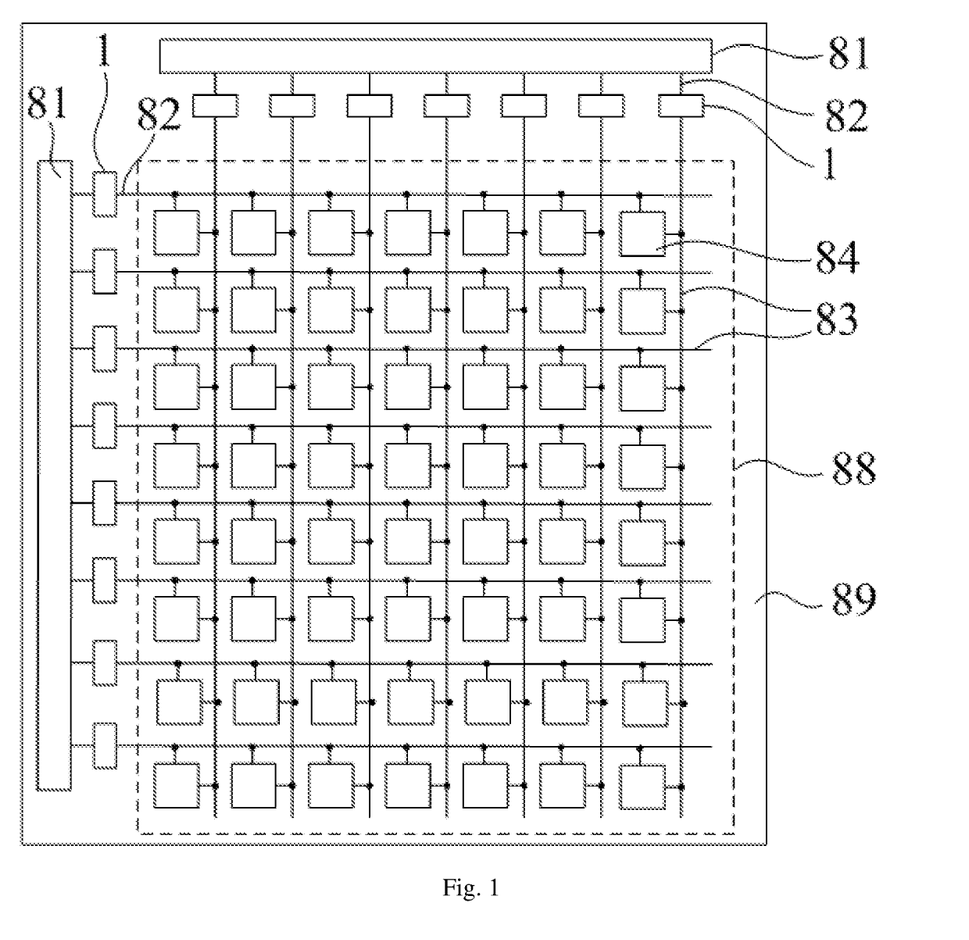
FIG. 1 is a schematic structural view of a display substrate according to one embodiment of the present disclosure.

In one embodiment, as shown in FIG. 1, a plurality of pixel units 84 (sub-pixels) are disposed in the display area 88 of the display substrate for display. A non-display area 89 is disposed outside the display area 88 (eg, on one side of the display area 88 or around the display area 88). The non-display area 89 is used to dispose the driving chip 81, the edge circuit, and the like. The connection structure 1 is provided in the non-display area 89. The connection structure 1 may be a structure for introducing a signal into the signal line 83, or a structure for electrically connecting with different structures. In the direction away from the substrate 9, the first conductive layer 11, the insulating layer 19 (which may be one or more), and the second conductive layer 12 are sequentially disposed in the connecting structure 1. Furthermore, the second conductive layer 12 is connected to the first conductive layer 11 through a plurality of via holes 3 in the insulating layer 19, and at least some of the via holes 3 have different contact areas with the first conductive layer 11.

Figure 8:
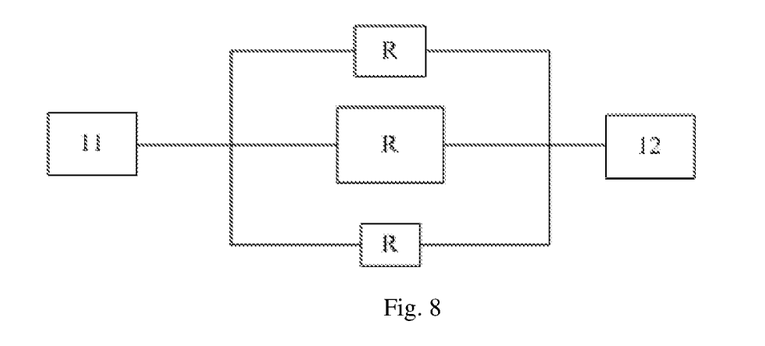
FIG. 8 is an equivalent circuit diagram of the connection structure according to one embodiment of the present disclosure.

Obviously, the resistance value at the via hole 3 is related to the contact area thereof. Thus, the resistance of the via holes 3 having different contact areas is also different. Therefore, as shown in FIG. 8, in each of the connection structures 1, the first conductive layer 11 and the second conductive layer 12 are connected by a plurality of resistors (each resistor corresponding to one via hole 3) connected in parallel and having different resistance values. When a current passes through a resistor, heat generated is $Q=I^2R*t$, where I is the current flowing through the resistor, R is the resistance of the resistor, and t is the time. It can be seen that when the connection structure 1 generates an overcurrent due to static electricity accumulation or the like, the current is shunted and passed through the plurality of via holes 3, respectively, so that the current I in each of the via holes 3 is reduced, and the amount of heat generated is also reduced. Moreover, the via holes 3 having different contact areas have different resistances, and the amount of current and the amount of heat generated are also different, thereby ensuring that at least some of the via holes 3 are not burned out when an overcurrent occurs.

Figure 2:
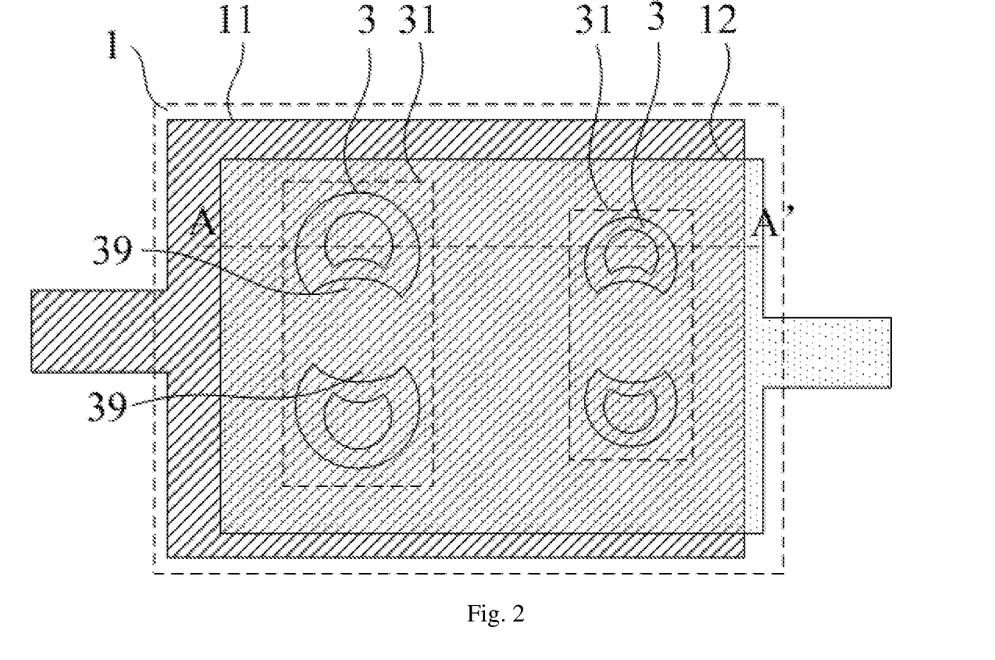
FIG. 2 is a partial structural schematic view showing a connection structure of a display substrate according to one embodiment of the present disclosure.
Figure 4:
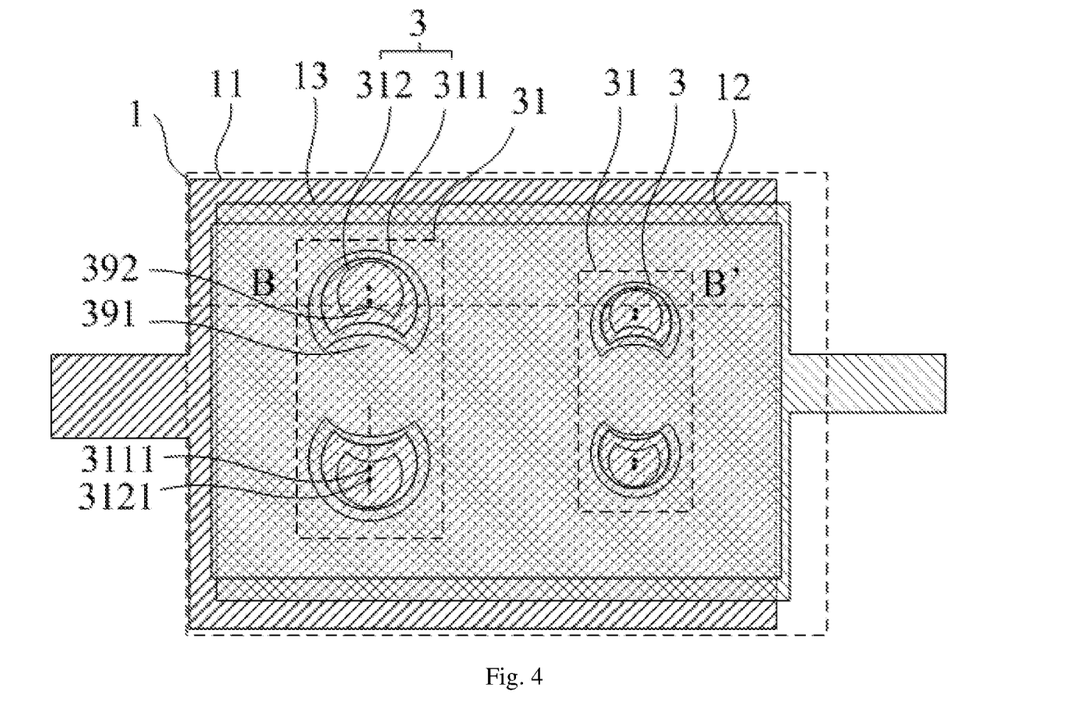
FIG. 4 is a partial structural schematic view showing a connection structure of a display substrate according to one embodiment of the present disclosure.
Figure 6:
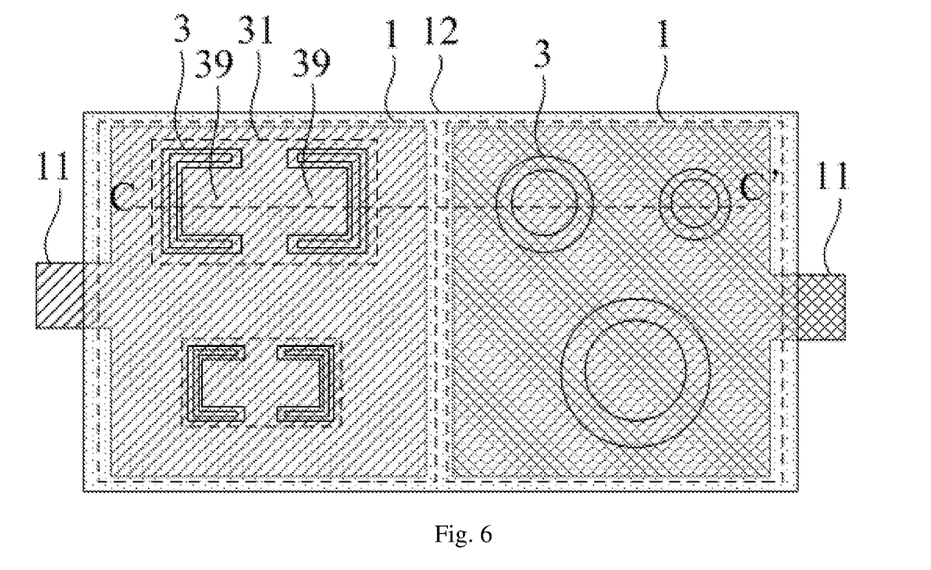
FIG. 6 is a partial structural schematic view showing a connection structure of a display substrate according to one embodiment of the present disclosure.

Optionally, in each of the connection structures 1, at least two of the via holes 3 have different shapes. In one embodiment, in each of the connection structures 1, at least two of the via holes 3 have different, but similar shapes. That is to say, at least some of the via holes 3 may be different in shape in each of the connection structures 1. Referring to FIGS. 2, 4, and 6, the above "different shapes" include similar shapes but different sizes. That is, two vial holes having different, but similar shapes means that one via hole 3 can be enlarged or reduced to have the same shape as the other via hole 3.

Of course, the above "different shapes" also include completely different shapes. In one embodiment, a cross-sectional shape of a via hole in a plane parallel to the first conductive layer is a circular, a C shape, or other shapes.

Obviously, when the shapes of the via holes 3 are different, it is possible to simultaneously cause their contact areas with the first conductive layer 11 to be different.

Optionally, at least some of the connection structures 1 comprise at least one set of adjacent via holes 31. Each set of adjacent via holes 31 is formed by two adjacently disposed via holes 3. Furthermore, at least one of the two adjacent via holes 3 is provided with a recess 39 at a position facing the other via hole 3. In one embodiment, in each set of adjacent via holes 31, each via hole 3 is provided with a recess 39 at a position facing the other via hole 3.

That is to say, some of the via holes 3 in the connection structure 1 may belong to more than one set of adjacent via holes 31 (one via hole 3 may belong to a plurality of sets of adjacent via holes 31). There are two adjacent via holes 3 in each set of adjacent via holes 31. As shown in FIGS. FIG. 2, FIG. 4 and FIG. 6, for the two adjacent via holes 3, at least one of the via holes 3 is provided with a recess 39 at a position opposite the other via hole 3. That is, the via hole 3 does not constitute a complete pattern at a position opposite the other via hole 3, but is "lack of a piece" or "concave." In one embodiment, each of the via holes 3 is provided with a recess 39 at a position opposite the other via hole 3.

When an overcurrent occurs, each of the via holes 3 will generate heat. The area between the adjacent via holes 31 will simultaneously absorb the heat generated by the two via holes 3. Thus, the temperature of the area between the adjacent via holes 31 is higher, and it is more likely to be burned out and cause a defect here. On the other hand, if the via hole 3 is provided with the recess 39 at a position opposite the other via hole 3, the distance between the via holes 3 is increased, thereby reducing the heat accumulation in the area between the adjacent via holes 31, and reducing the amount of heat generated therein. As a result, the temperature and the possibility of being burned out at the area between the adjacent via holes 31 are decreased.

In each set of adjacent via holes 31, at least some of the via holes 3 are divided into a first via hole 311 and a second via hole 312. The first via hole 311 and the second via hole 312 are connected. The first via hole 311 has a first center 3111, and the second via hole 312 has a second center 3121 at a position which is different from the first center 3111.

The recess 39 includes a first recess 391 disposed on the first via 311, and a second recess 392 disposed on the second via 312. One radial direction of the first recess 391 coincides with a line between the first center 3111 and the second center 3121, and one radial direction of the second recess 392 coincides with a line between the first center 3111 and the second center 3121. That is, one radial direction of the first recess or the second recess refers to a direction from a point on the arc constituting the first recess or the second recess to a center of the arc constituting the first recess or the second recess, respectively. In other words, the centers of the first recess and the second recess 391, 392 and the centers 3111, 3121 of the two via holes 311, 312 are located on a same straight line.

Referring to FIG. 4, each of the adjacent via holes 31 may be composed of two different small via holes 311, 312 in the depth direction. The positions of the two small via holes 311, 312 are different, so that both small via holes 311, 312 have different centers 3111, 3121 respectively. At this time, the two small via holes 311, 312 respectively have respective small recesses 391, 392. The two small recesses 391, 392 each have a radial line connecting the centers 3111 and 3121 of the two small via holes 311, 312. In other words, the centers of the two small recesses 391, 392 and the centers 3111, 3121 of the two small via holes 311, 312 are located on a same straight line (dashed line in FIG. 4). This is more conducive to the even distribution of heat, and better to avoid damage.

Optionally, the number of via holes 3 in each connection structure 1 is in a range between 2 and 4.

Obviously, if the contact area of the via hole 3 is to be different, at least two via holes 3 are required in each of the connection structures 1. But the number of via holes 3 in each of the connection structures 1 is also limited due to the limitation of the layout area and the like. In one embodiment, the number of via holes 3 in each connection structure 1 is in a range between 2 to 4.

Optionally, as a form of the embodiment of the present disclosure, in at least some of the connection structures 1, the first conductive layer 11 is a signal introduction line 82, and the signal introduction line 82 is used for electrically connecting with a driving signal source. The second conductive layer 12 is a signal line 83 extending into the display area 88 for driving the pixel units 84 in the display area 88. In one embodiment, the signal line 83 includes a gate line and/or a data line.

Figure 3:
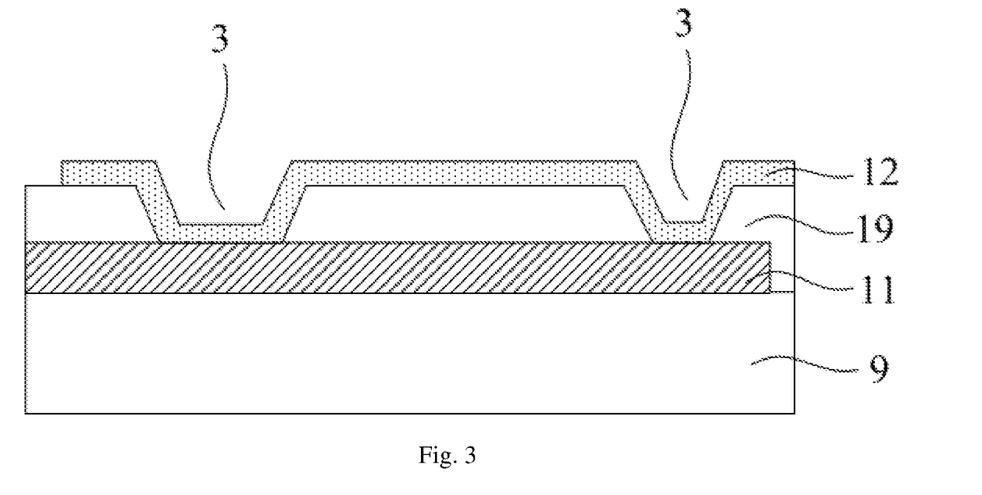
FIG. 3 is a schematic cross-sectional view along line AA' of FIG. 2.

That is, the connection structure 1 can be used to introduce a driving signal from a driving signal source into the signal line 83. As shown in FIGS. 1 to 3, the first conductive layer 11 of the connection structure 1 is a signal introduction line 82, and the signal introduction line 82 in each connection structure 1 is connected to a driving signal source (such as a terminal of the driving chip 81 or an output terminal of one stage of the shift register). The second conductive layer 12 is a signal line 83 such as a gate line and/or a data line extending into the display area 88. The signal line 83 is connected to the signal introduction line 82 through the via holes 3 in the connection structure 1, thereby receiving a driving signal from the driving signal source, and supplying the driving signal to the pixel units 84 in the display area 88.

Optionally, in at least some of the connection structures 1, the second conductive layer 12 is a signal introduction line 82, and the signal introduction line 82 is electrically connected to the driving signal source. The conductive layer 11 is a signal line 83 extending into the display area 88 for driving the pixel units 84 in the display area 88.

That is to say, it is also possible that the second conductive layer 12 is the signal introduction line 82, and the first conductive layer 11 is the signal line 83.

Optionally, at least some of the connecting structures 1 further include a third conductive layer 13 disposed between the first conductive layer 11 and the second conductive layer 12. At least one insulating layer 19 is provided between the third conductive layer 13 and the first conductive layer 11. At least one insulating layer 19 is provided between the third conductive layer 13 and the second conductive layer 12. The via hole 3 connecting the first conductive layer 11 and the second conductive layer 12 is divided into an upper via hole penetrating the insulating layer 19 between the second conductive layer 12 and the third conductive layer 13 and a lower via hole penetrating through the third conductive layer 13 and through the insulating layer 19 between the third conductive layer 13 and the first conductive layer 11. The upper via hole is in connected with the lower via hole. The second conductive layer 12 is connected to the third conductive layer 13 through the upper via hole and to the first conductive layer 11 through the lower via hole.

Figure 5:
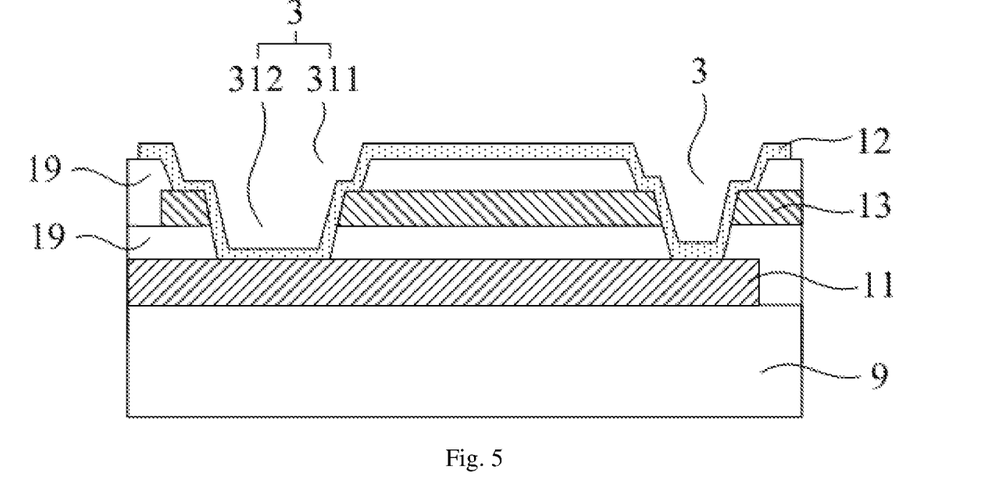
FIG. 5 is a schematic cross-sectional view along line BB' of FIG. 4.

Referring to FIG. 4 and FIG. 5, a third conductive layer 13 may be disposed between the first conductive layer 11 and the second conductive layer 12. An insulating layer 19 is disposed between the third conductive layer 13 and each of the two conductive layers above and below, respectively. Thereby, the above via hole 3 is also divided into two parts in the depth direction, that is, an upper via hole (which can be regarded as the above first via hole 311) in the insulating layer 19 above the third conductive layer 13, and a lower via hole located in the third conductive layer 13 and the insulating layer 19 below the third conductive layer 13 (which can be regarded as the above second via 312). The second conductive layer 12 is connected to the third conductive layer 13 through the first via hole 311. Furthermore, the second conductive layer 12 further extends downward from the bottom of the first via hole 311 and is connected to the first conductive layer 11 through the second via hole 312. Thereby, the second conductive layer 12 actually electrically connects the first conductive layer 11 and the third conductive layer 13 to realize signal transmission between the first conductive layer 11 and the third conductive layer 13. With respect to the manner in which the first conductive layer 11 is directly connected to the third conductive layer 13, the total depth of the via holes 3 which actually function as a connection in the above manner is larger, and the heat generated therein can be better dispersed to avoid damage.

Optionally, the opening of the upper via hole at the surface of the third conductive layer 13 opposite from the first conductive layer 11 is larger than the opening of the lower via hole at the surface of the third conductive layer 13 opposite from the first conductive layer 11, so that the second conductive layer 12 is in contact with the surface of the third conductive layer 13 opposite from the first conductive layer 11.

In one embodiment, the size of the upper via hole (the first via 311) and the size of the lower via hole (the second via 312) at the junction are preferably different. That is, the opening of the lower end of the first via hole 311 is larger than the opening of the upper end of the second via hole, so that a part of the top surface of the third conductive layer 13 (the surface opposite from the first conductive layer 11) is exposed by the first via hole 311. Therefore, the top surface of the third conductive layer 13 can be in contact with the bottom surface of the second conductive layer 12 in the first via hole 311. Such contact is the contact between the top surface of the third conductive layer 13 and the bottom surface of the second conductive layer 12, and the contact area thereof is large and relatively reliable.

Optionally, the sidewall of the lower via hole has a slope angle between 15 degrees and 75 degrees.

Obviously, since a part of the lower via hole (the second via hole 312) is located in the third conductive layer 13, a part of the sidewall of the second via hole 312 is a sidewall of the third conductive layer 13. Therefore, the sidewall of the third conductive layer 13 is in contact with the second conductive layer 12 in the second via hole 312 at some locations. When the slope angle of the sidewall of the second via hole 312 is in the above range, the sidewall of the third conductive layer 13 can be ensured a more effective contact with the second conductive layer 12. Moreover, the second conductive layer 12 can be prevented from being broken in the via hole, thereby improving effect and reliability of the connection.

Of course, although the first via hole 311 and the second via hole 312 are used as examples of the upper via hole and the lower via hole, if the center positions of the upper via hole and the lower via hole are not deviated from each other or there is no recess therein, it is also possible that the upper via hole and the lower via hole are not the first via hole and second via hole respectively.

Optionally, as another form of embodiment of the present disclosure, the display substrate includes at least one bridging structure, and each bridging structure is composed of two connecting structures 1. The two first conductive layers 11 of the two connection structures 1 of each bridging structure are spaced apart from each other, and the two second conductive layers 12 thereof are disposed in the same layer and integrally connected. In one embodiment, the two first conductive layers 11 of the two connection structures 1 of each bridging structure may be disposed in different layers.

Figure 7:
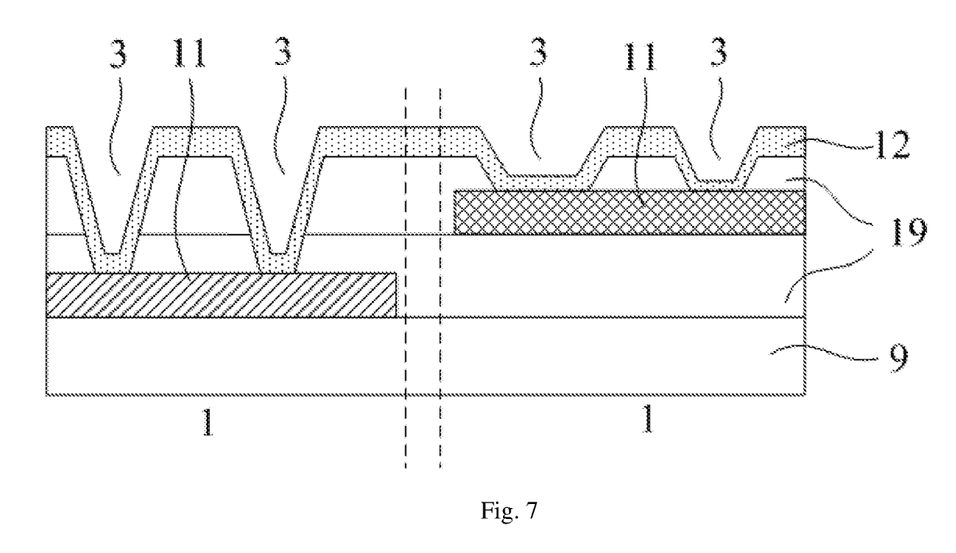
FIG. 7 is a cross-sectional structural view along CC' in FIG. 6.

That is to say, the connection structure 1 can also be used as a "bridge" between two structures. Referring to FIG. 6 and FIG. 7, two adjacent connecting structures 1 constitute a bridging structure. The second conductive layers 12 of the two connecting structures 1 are integrally connected, and the two first conductive layers 11 thereof are separated from each other (and the two first conductive layers 11 are preferably disposed in different layers). Since the second conductive layer 12 in each of the connection structures 1 is connected to its own first conductive layer 11 through the via holes 3, the bridging structure integrally connects the two different first conductive layers 11 together, that is, realizing "bridge" of the different structures.

Of course, the specific form of the connection structure 1 is not limited to the above example, as long as the second conductive layer is connected to the first conductive layer through a plurality of via holes 3 having different areas.

One embodiment of the present disclosure provides a display panel. The display panel includes any of the above display substrates according to some embodiments of the present disclosure.

That is to say, the above display substrate, the counter substrate (such as a cover plate, a color filter substrate, etc.), and other structures (such as a driving chip, a liquid crystal, a packaging material, etc.) can be combined to form a display panel having a basic display function.

Figure 9:
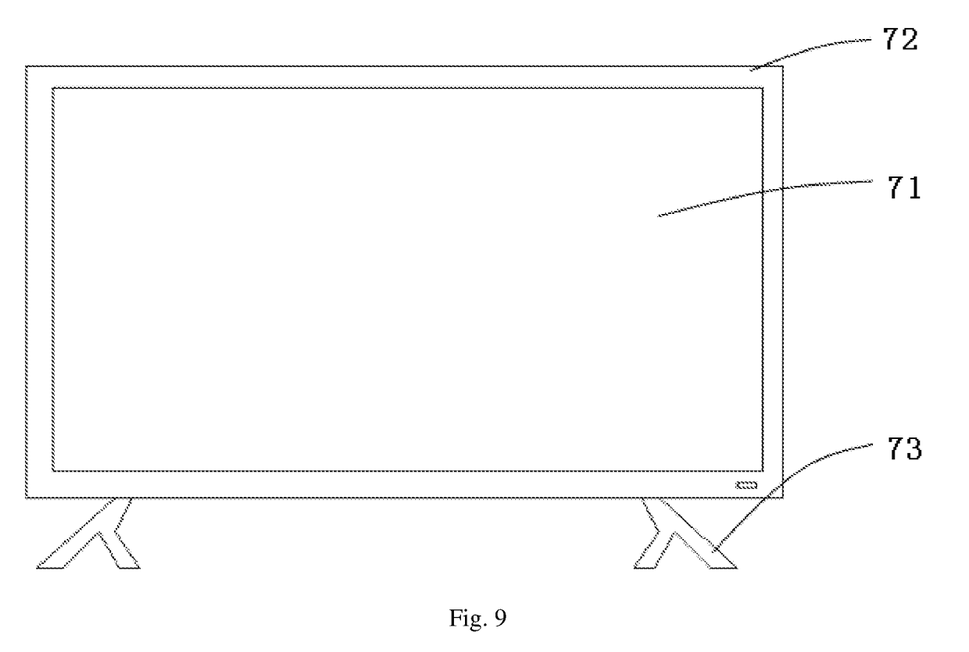
FIG. 9 is a schematic structural view of a display apparatus according to one embodiment of the present disclosure.

Referring to FIG. 9, one embodiment of the present disclosure provides a display apparatus. The display apparatus includes any of the above display panels 71. That is to say, the above display panel 71 can be combined with other structures to form a display apparatus having a complete function.

For example, referring to FIG. 9, in addition to the above display panel 71, the display apparatus may further include a front frame 72, a rear case, a base 73, a circuit board, a power connection line, an adapter board, a backlight, and the like.

Specifically, the display apparatus can be any display product such as a liquid crystal display panel, an organic light emitting diode (OLED) display panel, an electronic paper, a mobile phone, a tablet computer, a television, a display, a notebook computer, a digital photo frame, a navigator, or the like.

The principles and the embodiments of the present disclosure are set forth in the specification. The description of the embodiments of the present disclosure is only used to help understand the apparatus and method of the present disclosure and the core idea thereof. Meanwhile, for a person of ordinary skill in the art, the disclosure relates to the scope of the disclosure, and the technical scheme is not limited to the specific combination of the technical features, but also covers other technical schemes which are formed by combining the technical features or the equivalent features of the technical features without departing from the inventive concept. For example, a technical scheme may be obtained by replacing the features described above as disclosed in this disclosure (but not limited to) with similar features.

What is claimed is:

1. A display substrate, comprising:
   at least one connection structure in a non-display area of the display substrate, the at least one connection structure comprising: a first conductive layer, at least one insulating layer on the first conductive layer, and a second conductive layer on a side of the at least one insulating layer opposite from the first conductive layer;
   wherein the second conductive layer is connected to the first conductive layer through a plurality of via holes in the at least one insulating layer, and at least two of the plurality of via holes have different contact areas with the first conductive layer;
   the plurality of via holes comprise at least one set of adjacent via holes, the set of adjacent via holes comprising two adjacent via holes, and at least one of the two adjacent via holes is provided with a recess at a position facing the other one of the two adjacent via holes;
   the two adjacent via holes do not overlap with each other;
   at least one of the two adjacent via holes comprises a first via hole and a second via hole, the first via hole has a first center, the second via hole has a second center at a different position from the first center, and the first via hole and the second via hole forms a same through hole.

2. The display substrate of claim 1, wherein at least two of the plurality of via holes have different shapes.

3. The display substrate of claim 1, wherein the two adjacent via holes have a crescent shape, and two recesses in the two adjacent via holes face each other.

4. The display substrate of claim 1, wherein each of the two adjacent via holes is provided with a recess at a position facing the other one of the two adjacent via holes.

5. The display substrate of claim 1, wherein the first via hole and the second via hole have similar outer contours with one outer contour surrounding one other outer contour, and each of the outer contours has a recess facing a same direction.

6. The display substrate of claim 1, wherein the recess comprises a first recess on the first via hole and a second recess on the second via hole, one radial direction of the first recess coincides with a line between the first center and the second center, and one radial direction of the second recess coincides with a line between the first center and the second center.

7. The display substrate of claim 1, wherein a number of the plurality of via holes is in a range of two to four.

8. The display substrate of claim 1, wherein the connection structure further comprises a third conductive layer between the first conductive layer and the second conductive layer, the at least one insulating layer is between the first conductive layer and the third conductive layer, and at least another insulating layer is between the third conductive layer and the second conductive layer.

9. The display substrate of claim 8, wherein at least one of the plurality of via holes connecting the first conductive layer and the second conductive layer comprises an upper via hole penetrating the at least another insulating layer between the second conductive layer and the third conductive layer and a lower via hole penetrating the third conductive layer and the at least one insulating layer between the third conductive layer and the first conductive layer; and
   wherein the upper via hole is connected with the lower via hole, and the second conductive layer is connected to the third conductive layer through the upper via hole and further connected to the first conductive layer through the lower via hole.

10. The display substrate of claim 9, wherein an area of an opening of the upper via hole at a surface of the third conductive layer opposite from the first conductive layer is larger than an area of an opening of the lower via hole at the surface of the third conductive layer opposite from the first conductive layer, such that the second conductive layer is in contact with the surface of the third conductive layer opposite from the first conductive layer.

11. The display substrate of claim 9, wherein a slope of a sidewall of the lower via hole is in a range of between 15 degrees and 75 degrees.

12. The display substrate of claim 1, comprising at least one bridging structure composed of two of the at least one connection structure;
   for the two of the at least one connection structure, the two first conductive layers are spaced apart from each other, and the two second conductive layers are disposed in the same layer and integrally connected.

13. The display substrate of claim 12, wherein for the two of the at least one connection structure, the two first conductive layers are disposed in different layers.

14. The display substrate of claim 1, wherein the first conductive layer is a signal introduction line, and the signal introduction line is configured to electrically connect with a driving signal source;
   the second conductive layer is a signal line extending into a display area of the display substrate, and the signal line is configured to drive pixel units in the display area.

15. The display substrate of claim 1, wherein the second conductive layer is a signal introduction line, and the signal introduction line is configured to electrically connect with a driving signal source;
   the first conductive layer is a signal line extending into a display area of the display substrate, and the signal line is configured to drive pixel units in the display area.

16. The display substrate of claim 14, wherein the signal line includes a gate line or a data line.

17. A display panel, comprising the display substrate of claim 1.

18. A display apparatus, comprising the display panel of claim 17.

* * * * *